United States Patent
Alfter et al.

(10) Patent No.: US 11,312,343 B2
(45) Date of Patent: Apr. 26, 2022

(54) MOTOR VEHICLE CONTROL UNIT FOR AN ELECTRIC PARKING BRAKE

(71) Applicant: Lucas Automotive GmbH, Koblenz (DE)

(72) Inventors: Ingo Alfter, Sinzig (DE); Stefan Grieser-Schmitz, Koblenz (DE)

(73) Assignee: ZF Active Safety GmbH, Koblenz (DE)

(*) Notice: Subject to any disclaimer, the term of this patent is extended or adjusted under 35 U.S.C. 154(b) by 427 days.

(21) Appl. No.: 16/474,406

(22) PCT Filed: Dec. 12, 2017

(86) PCT No.: PCT/EP2017/082403
§ 371 (c)(1),
(2) Date: Jun. 27, 2019

(87) PCT Pub. No.: WO2018/121979
PCT Pub. Date: Jul. 5, 2018

(65) Prior Publication Data
US 2019/0344762 A1     Nov. 14, 2019

(30) Foreign Application Priority Data

Dec. 27, 2016   (DE) .................. 10 2016 015 544.2

(51) Int. Cl.
*B60T 7/00*     (2006.01)
*B60T 8/17*    (2006.01)
(Continued)

(52) U.S. Cl.
CPC ............ *B60T 8/17* (2013.01); *B60W 50/023* (2013.01); *B60T 13/662* (2013.01);
(Continued)

(58) Field of Classification Search
CPC ...... B60T 8/17; B60T 13/662; B60T 2201/10; B60T 2220/04; B60T 2270/402;
(Continued)

(56) References Cited

U.S. PATENT DOCUMENTS 6,394,235 B1   5/2002  Poertzgen et al.
6,626,271 B1   9/2003  Böhm et al.
(Continued)

FOREIGN PATENT DOCUMENTS

DE      19732168 C1   1/1999
DE      19826687 A1   12/1999
(Continued)

OTHER PUBLICATIONS

PCT International Search Report and Written Opinion, Application No. PCT/EP2017/082403, dated May 4, 2018.

*Primary Examiner* — Shardul D Patel
(74) *Attorney, Agent, or Firm* — Robert James Harwood

(57) ABSTRACT

The invention relates to a motor vehicle control unit. The control unit comprises a first processor system, which is designed to control an actuator of an electric parking brake and at least one additional motor vehicle function unit. A second processor system of the control unit is designed to control the at least one actuator in an at least partially redundant manner to the first processor system. Furthermore, there is a changeover device, which is designed to enable an activation of the at least one actuator either via the first processor system or the second processor system.

21 Claims, 4 Drawing Sheets

Fig. 1

(51) Int. Cl.
  *B60W 50/023* (2012.01)
  *B60T 13/66* (2006.01)
(52) U.S. Cl.
  CPC ....... *B60T 2201/10* (2013.01); *B60T 2220/04* (2013.01); *B60T 2270/402* (2013.01)
(58) Field of Classification Search
  CPC ...... B60T 13/741; B60T 7/00; B60W 50/023; B60W 50/082; B60W 30/14; B60W 30/06; G05D 1/0061; B60Y 2300/06; G06F 7/70
  USPC .......................................................... 701/70
  See application file for complete search history.

(56) References Cited

U.S. PATENT DOCUMENTS

| | | | |
|---|---|---|---|
| 9,302,656 B2 | 4/2016 | Köth et al. | |
| 9,428,159 B2* | 8/2016 | Heise | B60T 13/588 |
| 2002/0092720 A1* | 7/2002 | Schafer | B60T 1/005 |
| | | | 188/158 |
| 2008/0105502 A1* | 5/2008 | Koth | B60T 7/085 |
| | | | 188/72.6 |
| 2013/0282249 A1* | 10/2013 | Heise | B60T 13/746 |
| | | | 701/70 |
| 2014/0129108 A1* | 5/2014 | Grieser-Schmitz | B60T 13/662 |
| | | | 701/70 |
| 2015/0134178 A1* | 5/2015 | Minoiu-Enache | B60W 50/035 |
| | | | 701/23 |
| 2015/0251639 A1* | 9/2015 | Sautter | B60T 8/174 |
| | | | 701/70 |
| 2017/0166173 A1* | 6/2017 | Lauffer | B60T 8/885 |
| 2017/0341634 A1 | 11/2017 | Heise | |
| 2017/0361816 A1* | 12/2017 | Besier | B60T 8/1761 |

FOREIGN PATENT DOCUMENTS

| | | |
|---|---|---|
| DE | 102011084534 A1 | 4/2012 |
| DE | 102014204287 A1 | 9/2015 |
| DE | 102015224708 A1 | 9/2016 |
| JP | 2008296849 A | 12/2008 |
| WO | 0234562 A1 | 5/2002 |
| WO | 2006061238 A1 | 6/2006 |

* cited by examiner

MOTOR VEHICLE CONTROL UNIT FOR AN ELECTRIC PARKING BRAKE

CROSS-REFERENCE TO RELATED APPLICATIONS

This application is the National Phase of International Application PCT/EP2017/082403 filed Dec. 12, 2017 which designated the U.S. and that International Application was published on Jul. 5, 2018 as International Publication Number WO 2018/121979 A1. PCT/EP2017/082403 claims priority to German Patent Application No. 10 2016 015 544.2, filed Dec. 27, 2016. The disclosures of both applications are incorporated herein by reference.

BACKGROUND OF THE INVENTION

The present invention relates generally to the field of control units for motor vehicles. Specifically, the control of an electric parking brake by means of a control unit is described.

Electric parking brakes (EPB) have been adopted in a multitude of modern motor vehicles and typically comprise two electric actuators on different vehicle wheels and an EPB control unit associated with the actuators.

In a hydraulic motor vehicle brake system, the EPB actuators are installed on the wheel brakes of two opposing vehicle wheels and facilitate electric actuation of a respective wheel brake cylinder in parking brake operation (details of this can be found, for example, in DE 197 32 168 A). In normal braking operation, on the other hand, the wheel brake cylinders are actuated hydraulically. The wheel brake cylinders are connected fluidically to a main cylinder for this purpose.

In a conventional hydraulic brake system, the main cylinder is coupled mechanically to a brake pedal. In a so-called brake-by-wire (BBW) system, on the other hand, the brake pedal is mechanically decoupled from the main cylinder, at least in normal braking operation. The brake pedal actuation is detected here by sensor and electronically processed to control an electric actuator acting on the main cylinder. Furthermore, electric brake boosters (also called Electric Brake Boost, EBB) are known, in which a force introduced by means of the brake pedal onto the main cylinder is boosted by an electric actuator likewise acting on the main cylinder.

On account of the cost pressure in the automotive industry, it is desirable to reduce the system costs through economies. At the same time, system safety must not suffer due to the pertinent economies. These stipulations apply in particular also to the brake system installed in the vehicle.

In this context the control of EPB actuators by means of the control unit associated with an automatic transmission is proposed in WO 2006/061238 A1, for example. Traditional transmission locking in the form of a parking lock can be saved on in this way. The transmission control unit is provided in addition to the regular EPB control unit. WO 2006/061238 A1 also includes different approaches to redundant design of EPB-relevant communications connections, in order to increase system safety.

SUMMARY OF THE INVENTION

The object of the present disclosure is to specify an EPB solution that is improved with regard to redundancy and cost.

According to a first aspect, a motor vehicle control unit is specified. The control unit comprises a first processor system, which is configured to control at least one EPB actuator and at least one other motor vehicle function unit. The control unit further comprises a second processor system, which is configured to control the at least one EPB actuator in an at least partially redundant manner to the first processor system. Furthermore, the control unit comprises a changeover device, which is configured to enable operation of the at least one EPB actuator either via the first processor system or the second processor system.

Each processor system can comprise at least one processor or at least one processor core. Each processor system can further comprise a storage device, on which program code for execution by the pertinent processor is stored. In some variants a common storage device can be provided for both processor devices. The two processor systems can comprise different processor cores of a single multicore processor or be comprised by two separate integrated circuits (e.g. two ASICs).

The control unit can form an independently manageable assembly. In particular, a dedicated housing can be provided for the control unit. The first processor system and the second processor system can be provided on a common circuit board.

The EPB actuators can be based on an electromechanical principle. In other variants the electric parking brake actuators can be operated electrohydraulically or electropneumatically.

The first processor system can be configured to control two EPB actuators, which are associated with different vehicle wheels. The same applies to the second processor system.

The first processor system and the second processor system can control the one or more EPB actuators in a partially redundant manner. This can mean, for example, that several EPB control options (e.g. closing of the EPB actuators) are available in any case to both the first processor system and the second processor system, in order still to enable (in any event partial) control of the one or more EPB actuators in the event of a failure of one of the two processor systems.

As explained above, the first processor system is configured to control, in addition to the at least one EPB actuator, at least one other motor vehicle function unit. This other function unit can be configured to brake the motor vehicle or to hold it stationary in a redundant manner to EPB. For example, the other motor vehicle function unit can be configured to implement one or more of the following functions: electric brake boosting (EBB); anti-blocking control (ABS); vehicle dynamics control (ESC); control of an automatic transmission (especially in connection with a parking lock); and electric brake force generation (e.g. BBW).

The control unit can also comprise at least one monitoring device, which is configured to monitor the functionality of the first processor system. Even two or more such monitoring devices can be provided in some variants. The at least one monitoring device, or each of the monitoring devices, can be configured to control the changeover device in dependence on the functionality of the first processor system.

According to a first variant, the monitoring device can be a function unit coupled to the first processor system and provided separately from the second processor system. According to a second variant, the monitoring device can be integrated into the second processor system, wherein the second processor system has an interface, in order to couple the monitoring device to the first processor system (e.g. so that the monitoring device can monitor the functionality of the first processor system via the interface). In general the second processor system according to the second variant can be configured to detect a lack of functionality of the first processor system by means of an absence of communication via the interface by the first processor system. Both variants can be combined in that two separate monitoring devices are provided, wherein the first monitoring device is a function unit provided separately from the second processor system and the second monitoring device is integrated into the second processor system.

The second processor system can be configured to close the at least one EPB actuator (or all EPB actuators) directly if a lack of functionality of the first processor system is detected. Such a configuration of the second processor system is possible in particular in autonomous or partly autonomous driving operation if it is to be assumed that the "fallback level" of driver intervention to brake the vehicle is not present.

In some variants the control unit can also comprise an EPB driver circuit. The EPB driver circuit can be configured to generate a control voltage for at least one H-bridge associated with the at least one EPB actuator. The corresponding H-bridge can likewise be contained in the control unit. If the control unit (e.g. in the scope of each of the two processor systems) is designed to control two EPB actuators, the control unit can accordingly comprise two H-bridges.

The EPB driver unit, the second processor system and the monitoring unit can be combined in an integrated circuit. This integrated circuit can be configured as an application-specific integrated circuit (thus as an ASIC). The first processor system can be combined in another integrated circuit (e.g. another ASIC). Both integrated circuits can be arranged on a single circuit board.

The changeover device can be configured to selectively enable the operation of the at least one EPB actuator either via the first processor system or the second processor system in that either the first processor system or the second processor system is permitted access to the EPB driver circuit.

In particular, if the functionality of the first processor system is inadequate, access of the first processor system to the EPB driver circuit can be refused in this way for safety reasons. In this case the second processor system can be activated in order to assume control of the at least one EPB actuator in a redundant manner to the first processor system.

The control unit can have at least one bus system, which is configured to couple the first processor system and the second processor system to the EPB driver circuit. In such a case the changeover device can be configured as a bus multiplexer. The changeover device configured as a bus multiplexer can specifically be provided functionally between the first processor system and the second processor system on one side and the EPB driver circuit on the other side.

The second processor system can have an interface for receiving a signal indicating a vehicle velocity (e.g. a wheel speed). In this case the control unit can be configured to enable an operability of the at least one EPB actuator by the second processor unit if it is to be inferred by means of the signal indicating the vehicle velocity that the vehicle velocity fulfils a predefined condition. The predefined condition can be a threshold value condition. In particular, the predefined condition can be formulated so that a certain velocity threshold value is not exceeded. The velocity threshold value can be under 10 km/h, in particular under 7 km/h and above all under 5 km/h.

The control unit can be configured to detect an autonomous or partly autonomous driving operation and to enable an operability of the at least one EPB actuator by the second processor unit if autonomous or partly autonomous driving operation is detected. The autonomous or partly autonomous driving operation can comprise, in particular, autonomous or partly autonomous parking or manoeuvring of the vehicle (in particular without the presence of a driver in the vehicle).

In this context the first processor system can be configured to signal the autonomous or partly autonomous driving operation to the second processor system by means of inter-processor communication. Specifically a corresponding interface can be provided for inter-processor communication between the first processor system and the second processor system. The control unit can further be configured to enable an operability of the at least one EPB actuator by the second processor system only if the autonomous or partly autonomous driving operation was signalled to the second processor system by the first processor system. If the operability of the at least one EPB actuator by means of the second processor system is enabled, operation of the at least one EPB actuator can then take place directly if a lack of functionality of the first processor system is detected (e.g. by the monitoring device explained above). In particular, the second processor system can be configured to close the at least one EPB actuator directly in autonomous or partly autonomous driving operation on detection of a lack of functionality of the first processor system.

According to another aspect, a method is specified for operating at least one EPB actuator. The method comprises a selective operation of the at least one EPB actuator via a first processor system or a second processor system, wherein the first processor system is configured to control the at least one EPB actuator and at least one other motor vehicle function unit. The second processor system is configured to control the at least one EPB actuator in an at least partially redundant manner to the first processor system.

The method can comprise or more other steps, as described above and in the following.

A computer program product is also specified, which comprises program code for carrying out the method presented here when the program code is executed on a motor vehicle control unit. A motor vehicle control unit is likewise specified, which comprises one or more storage devices, on which the corresponding computer program product is stored.

Various aspects of this invention will become apparent to those skilled in the art from the following detailed description of the preferred embodiment, when read in light of the accompanying drawings.

DETAILED DESCRIPTION OF THE INVENTION

Figure 1:
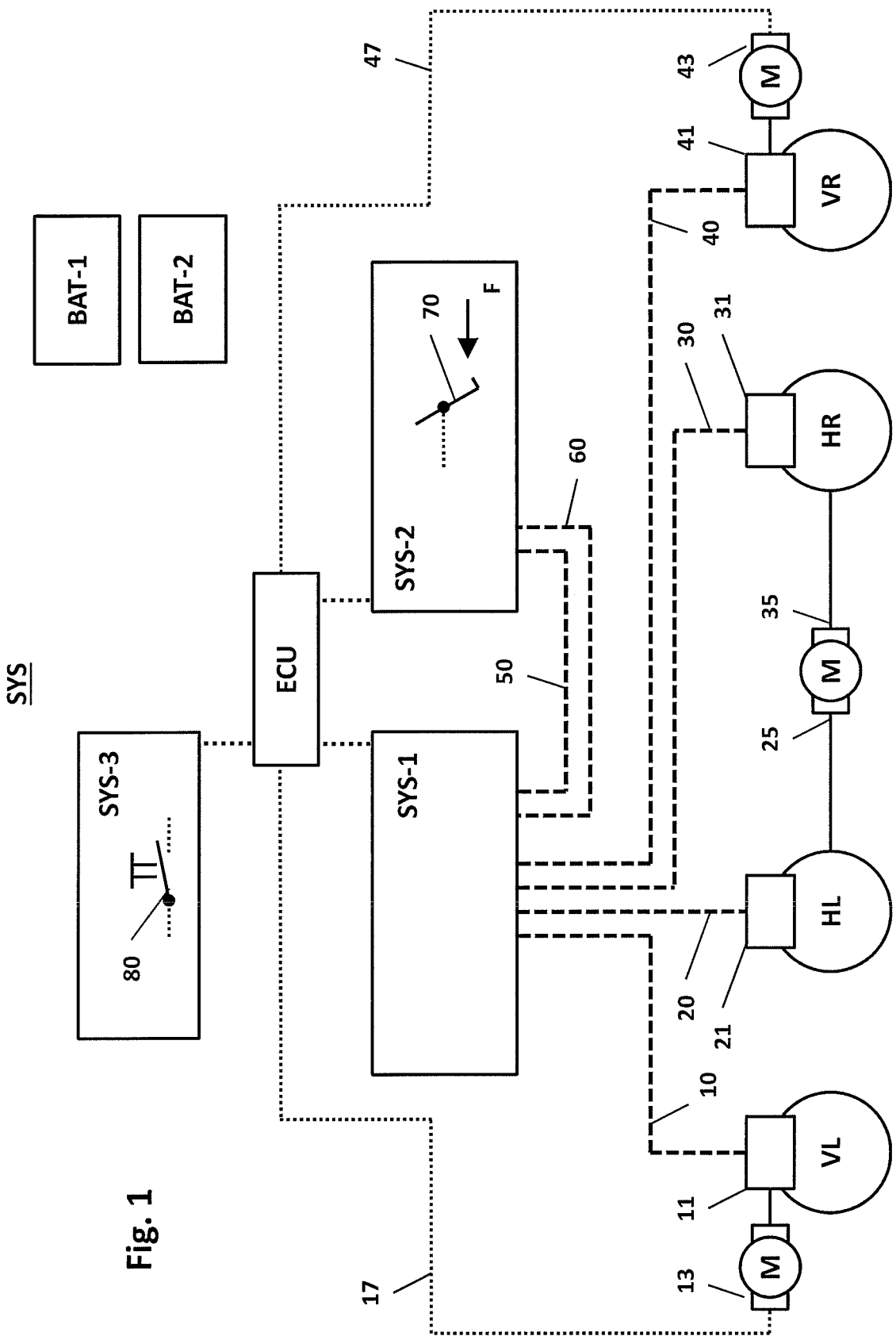
FIG. 1 is an exemplary embodiment of a vehicle system.

FIG. 1 depicts schematically an electronically controlled vehicle system SYS. The system SYS according to FIG. 1 comprises a first subsystem SYS-1, a second subsystem SYS-2, a third subsystem SYS-3 and a central electronic control unit (Electronic Control Unit, ECU). For a redundant electrical energy supply of the system SYS a first battery BAT-1 and a second battery BAT-2 are used.

The third subsystem SYS-3 is configured to implement an EPB function. Each of the other two systems SYS-1 and SYS-2 is configured to brake the motor vehicle autonomously or keep it stationary (in particular in a redundant manner to the EPB function). The central control unit ECU enables control of all three subsystems SYS-1, SYS-2 and SYS-3 in the exemplary embodiment shown in FIG. 1. The control unit ECU can therefore be understood as another component of each of the three subsystems SYS-1, SYS-2 and SYS-3. In other implementations the central control unit ECU could also be configured to control only one of the two subsystems SYS-1 and SYS-2 and to control the EPB actuators 13, 43 associated with the third subsystem SYS-3.

Connected via hydraulic lines 10, 20, 30 and 40 to the first subsystem SYS-1, more precisely to a hydraulic control unit (Hydraulic Control Unit, HCU) of the same, which is not depicted in FIG. 1, are hydraulically operable wheel brakes 11, 21, 31 and 41 of the vehicle. The first subsystem SYS-1 in the exemplary embodiment is a system that enables driver-independent, individual generation and adjustment of the brake pressures in the wheel brakes 11, 21, 31 and 41. The first subsystem SYS-1 can implement an anti-blocking and/or vehicle dynamics control system (ABS or Electronic Stability Control, ESC) that is now standard in vehicles, for example.

The second subsystem SYS-2 is connected via hydraulic lines 50, 60 to the first subsystem SYS-1. The second subsystem SYS-2 is designed to generate brake pressures for the first subsystem SYS-1 and/or the wheel brakes 11, 21, 31 and 41. For an understanding of the options resulting from the above and below "and/or" linkages between the terms "the first subsystem SYS-1" and "the wheel brakes 11, 21, 31 and 41", let the following variants be explained by way of example:

The second subsystem SYS-2 generates the brake pressures via the hydraulic lines 50, 60 directly for the wheel brakes 11, 21, 31 and 41 if the first subsystem SYS-1 is passive, thus no (e.g. overlaying) wheel-individual control interventions, such as ABS or ESC control, for instance, are executed.

However, if the first subsystem SYS-1 is active, in order e.g. to execute ABS or ESC control, then in some variants the second subsystem SYS-2 can provide the first subsystem SYS-1 via the hydraulic lines 50, 60 with brake pressures on the input side, so that the first subsystem SYS-1 can adjust brake pressures on the output side for the wheel brakes 11, 21, 31 and 41 in an individual wheel manner (e.g. by stopping, increasing or lowering the brake pressure). Such adjustment can take place even when the second subsystem SYS-2 does not provide any brake pressures. For this purpose the first subsystem SYS-1 comprises a separate brake pressure generator (e.g. an electrically operated hydraulic pump).

Since individual control interventions are not always necessary at the same time at all wheel brakes 11, 21, 31, 41, e.g. if only a front wheel on the outside of the curve is to be braked as part of an ESC adjustment, in order to prevent understeering of the vehicle, combinations of the two options named above are normal in practical operation.

The second subsystem SYS-2 is generally a brake caliper unit designed as a brake pressure generator system, such as an EBB or BBW assembly, for instance, which acts on a main cylinder in a hydraulic system design. As a brake caliper unit the second subsystem SYS-2 is configured to fulfil one or more of the following functions:

to detect a braking wish requested by the driver via a brake pedal 70, which is directed at deceleration of the motor vehicle;

to boost an actuating force F initiated by the driver via the brake pedal 70 by means of an actuator according to an electrical, electromechanical, electrohydraulic or electropneumatic principle;

to boost or generate the brake pressures for the first subsystem SYS-1 and/or the wheel brakes 11, 21, 31 and 41 by means of an electric actuator according to an electrical, electromechanical, electrohydraulic or electropneumatic principle.

The second subsystem SYS-2 can thus be operated inter alia in one or more of the following modes:

For the function of a hydraulic service brake, thus in normal braking operations, the actuating force F applied by the driver via the brake pedal 70 is boosted in particular by means of an electric actuator, wherein the brake pressures for the first subsystem SYS-1 and/or the wheel brakes 11, 21, 31 and 41 are generated in a main cylinder as a function of the boosted actuating force, preferably according to a predetermined booster characteristic.

If the brake system and in particular the second subsystem SYS-2 is designed as a BBW system, then for the function of the service brake and thus for normal braking operations the deceleration wish initiated by the driver via the brake pedal 70 is detected, in order to generate brake pressures for the first subsystem SYS-1 and/or the wheel brakes 11, 21, 31 and 41 as a function of this. In this case the deceleration wish is determined by means of a suitable sensor system, which detects the force and/or path characteristic initiated at the brake pedal 70. The deceleration wish is then converted by the control unit ECU into a control signal for an electric actuator, which acts on the main cylinder. The brake pedal 70, on the other hand, remains decoupled from the main cylinder. A simulator can convey a conventional pedal feeling to the driver in spite of the decoupling.

In the case of emergency braking, for example braking that must be guaranteed in spite of a defective battery (e.g. BAT-1 and/or BAT-2), the brake pressures for the first subsystem SYS-1 and/or the wheel brakes 11, 21, 31 and 41 are generated either according to a reduced booster characteristic compared with normal braking operations or directly as a function of the actuating force F introduced by the driver into the main cylinder via the brake pedal 70. In a BBW system, this takes place e.g. according to the push-through principle, in which the decoupling of brake pedal 70 and main cylinder is cancelled.

In the case of automatic braking, thus braking that takes place independently of an operation initiated by the driver via the brake pedal 70, the brake pressures for the first subsystem SYS-1 and/or the wheel brakes 11, 21, 31 and 41 are generated as a function of the parameters required for automatic braking, e.g. vehicle deceleration and vehicle velocity. Automatic braking operations take place e.g. in the context of adaptive adjustment of the vehicle velocity known as an ACC function (Adaptive Cruise Control) or vehicle dynamics control known as an ESC function, and in autonomous driving in AD operation (Autonomous Driving) or RCP operation (Remote Controlled Parking) of the vehicle.

In the case of regenerative braking, thus braking in which the kinetic energy of an electric or hybrid vehicle that is dissipated on braking is converted into electrical energy and fed back into a battery (e.g. BAT-1 and/or BAT-2) or similar, the deceleration wish initiated by the driver via the brake pedal 70 is determined initially unless automatic braking is involved. As a function of this, an electric drive 25, 35 of the vehicle, which drive acts here on the two rear wheels HL and HR, is operated as a generator. If automatic braking is involved, on the other hand, the generator operation of the electric drive 25, 35 takes place as a function of the deceleration necessary for the automatic braking operation. If the regenerative braking torque is not sufficient, thus the deceleration wish (no automatic braking) or the necessary deceleration (automatic braking) is greater than the maximum deceleration achievable in generator operation, a hydraulic braking torque is additionally applied for compensation in that corresponding brake pressures are generated and adjusted for the first subsystem SYS-1 and/or the wheel brakes 11, 21, 31 and 41. Let it be noted that the electric drive of the vehicle can naturally also act on the two front wheels VL, VR or on all four wheels VL, VR, HL, HR instead of on the two rear wheels HL, HR.

If the first subsystem SYS-1 is configured to generate brake pressures itself according to an electrohydraulic principle, which is regularly the case in an ESC system, for example, the first subsystem SYS-1 can generate and adjust brake pressures in one or more of the wheel brakes 11, 21, 31 and 41 independently of the second subsystem SYS-2. It is thus possible in certain implementation variants that automatic braking operations, in particular the ACC and ESC function, are executed autarchically by the first subsystem SYS-1. Another aspect in this context is that in this case hydraulic actuation of the wheel brakes 11, 21, 31 and 41 is guaranteed even in spite of a defective second subsystem SYS-2 or in spite of defective hydraulic lines 50, 60, due to which the operational safety of the brake system is increased.

As already explained above, the third subsystem SYS-3 implements the function of an EPB to be able to hold the vehicle stationary securely. The EPB system SYS-3 comprises a first electric, preferably electromechanical actuator 13 and a second electric, preferably electromechanical actuator 43. The actuator 13 acts in the exemplary embodiment on the wheel brake 11 associated with the front wheel VL and the actuator 43 on the wheel brake 41 associated with the front wheel VR. In the system according to FIG. 1, it is advantageous if, as here, the two actuators 13 and 43 of the EPB system act on the front wheels VL and VR of the vehicle, as due to the dynamic axle load distribution these can transmit a substantially greater brake force share than the rear wheels of the vehicle. However, the two actuators 13 and 43 could naturally also act on the rear wheels HL and HR of the vehicle.

For the EPB function no dedicated control unit is provided in the exemplary embodiment, as according to FIG. 1 the actuator 13 and the actuator 43 can be controlled by the central control unit ECU via a control line 17 and a control line 47 respectively. As an input device the third subsystem SYS-3 comprises an actuating element 80 (e.g. a switch or button), via which the driver enters his control command. The control command—typically "close parking brake" or "open parking brake"—is detected and evaluated by the control unit ECU. The actuators 13, 43 are then operated by the control unit ECU according to the result of the evaluation.

It is also possible for the control unit ECU to operate the EPB actuators 13, 43 independently of operation of the actuating element 80, thus independently of the control wish of the driver. This takes place e.g. as part of a hill start aid known as an HH (Hill Holder) function, which prevents the vehicle from rolling away on an inclined road due to automatic closing of the EPB and facilitates a comfortable start-up of the vehicle on the inclined road by automatic opening of the EPB (e.g. as a function of the inclination angle and/or the torque provided by the drive motor of the vehicle). The EPB actuators 13, 43 can also be controlled by the control unit ECU to perform braking operations or emergency braking operations autonomously, in particular as a fallback level in AD or RCP operation, for example.

In these applications the EPB actuators 13, 43 offer a further fallback level in the event of failures of the first subsystem SYS-1 and/or the second subsystem SYS-2, in order to be able to perform emergency braking operations or hold the vehicle stationary, for example. In connection with highly automated driving, in particular in RCP operation (during which the driver may even be located outside the vehicle), the availability of the second subsystem SYS-2 is restricted anyway, as no actuation of the brake pedal 70 for emergency braking operations is possible on account of the absence of any influencing opportunity of the driver. This is equivalent to a partial (mechanical) failure of the second subsystem SYS-2, although it is then to be assumed, however, that the control unit ECU is functional, in order to control the EPB actuators 13, 43.

Figure 2:
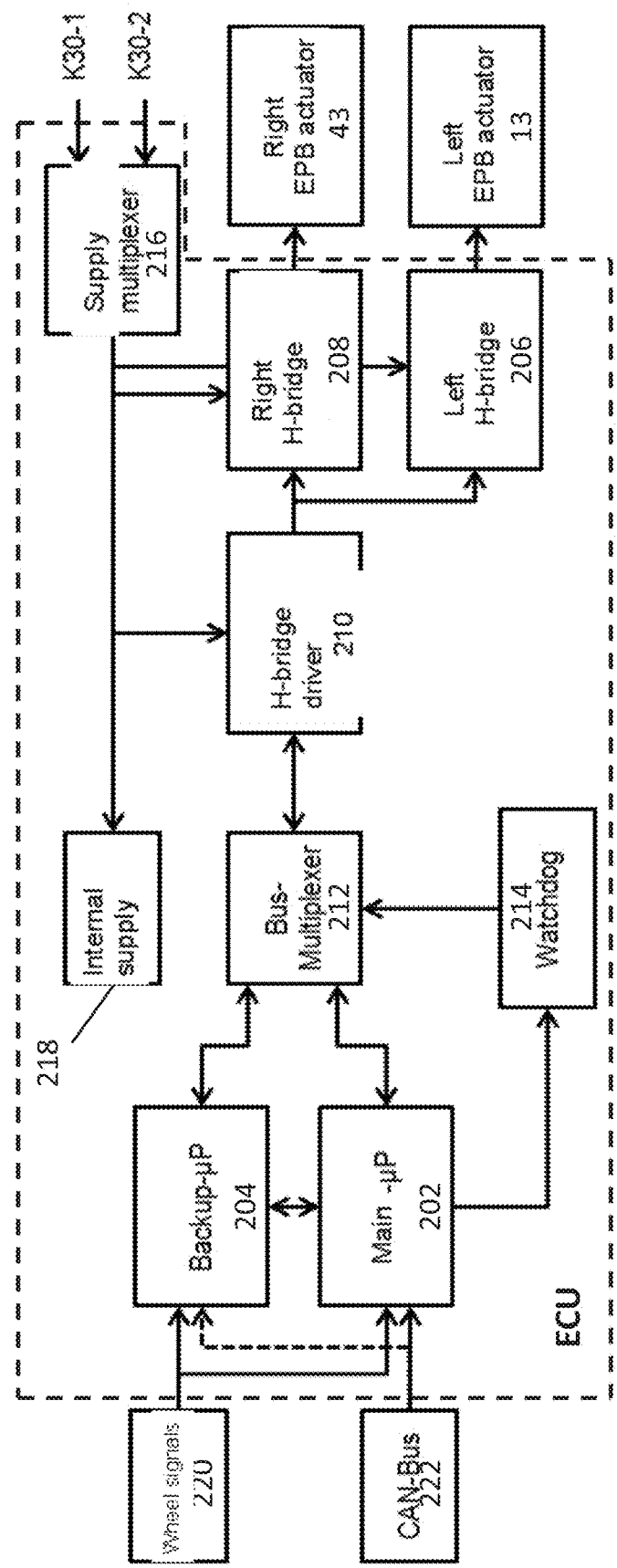
FIG. 2 is an exemplary embodiment of a control unit for the vehicle system according to FIG. 1.

FIG. 2 shows an exemplary embodiment of the control unit ECU from FIG. 1 in a schematic view. It is understood that the control unit ECU depicted in FIG. 2 can be used in vehicle systems that deviate from the system in FIG. 1.

As shown in FIG. 2, the control unit ECU comprises a first processor system 202 with at least one main processor and a second processor system 204 with at least one back-up processor. The first processor system 202 and the second processor system 204 can be realised by different processor cores of a multicore processor. Alternatively to this, the first processor system 202 and the second processor system 204 can be realised by separate integrated circuits (e.g. separate ASICs). The two processor systems 202, 204 can be provided on separate circuit boards or on the same circuit board inside a housing of the control unit ECU.

Each of the two processor systems 202, 204 is configured to control the two EPB actuators 13, 43. In the present exemplary embodiment the second processor system 204 is configured exclusively for control of the two EPB actuators 13, 43, while the first processor system 202 also facilitates the control of at least one other motor vehicle function unit. This other function unit is configured to brake the motor vehicle or to hold it stationary in a redundant manner to the EPB actuators 13, 43. In this respect let reference be made to the two subsystems SYS-1 and/or SYS-2 from FIG. 2 by way of example. The first processor system 202 can be configured specifically to operate an electric actuator, such as an electric motor with downstream linear transmission or an electric motor with downstream pump piston, of at least one of the two subsystems SYS-1 and/or SYS-2. Furthermore, the first processor system 202 is able to control the EPB actuators 13, 43 as part of the regular EPB function of the subsystem SYS-3 and independently of this subsystem SYS-3 (thus in particular independently of an operation of the actuating element 80).

A separate H-bridge 206, 208 is provided in the control unit ECU for each of the two EPB actuators 13, 43. The H-bridges 206, 208 can comprise power transistors in a known manner. To control the two H-bridges 206, 208 an H-bridge driver 210 is provided. The H-bridge driver 210 is generally configured to convert control signals from one of the two processor systems 202, 204 into electrical driver signals (in the form of control voltages) for the two H-bridges 206, 208. Other details with regard to the two H-bridges 206, 208 and the H-bridge driver 210 can be gathered from DE 10 2014 204 287 A1, for example. The disclosure content of this printed publication in regard to the components 206, 208 and 210 is hereby incorporated into the present disclosure content.

The two processor systems 202, 204 are connected to the H-bridge driver 210 via a bus system (via a so-called CAN bus, for example). A changeover device 212 is provided functionally between the two processor systems 202, 204 on one side and the H-bridge driver 210 on the other side. In the present exemplary embodiment, the changeover device 212 is configured as a bus multiplexer in order to enable access to the EPB actuators 13, 43 either via the first processor system 202 or the second processor system 204.

The control unit ECU further comprises a monitoring device 214 described as a watchdog. The monitoring device 214 is configured to monitor the functionality of the first processor system 202 and in the event of failure to make a changeover to the second processor system 204 by means of the changeover device 212. The potentially defective first processor system 202 is decoupled in this way from the H-bridge driver 210, so that no potentially faulty signals of the first processor system 202 can lead to unintentional operation or non-operation of one or more of the EPB actuators 13, 43. The monitoring device 214 specifically facilitates control of the changeover device 212 depending on the functionality of the first process system 202.

In the exemplary embodiment according to FIG. 2, the monitoring device 214 is configured as a function unit coupled to the first processor system 202 and provided separately from the second processor system 204. Alternatively (or in addition to this) the monitoring device 214 (or another such monitoring unit) could be integrated into the second processor system 204. In this case the second processor system 204 can have an interface to couple the corresponding monitoring device to the first processor system 202 to monitor the functionality of the first processor system 202. In this case a lack of functionality of the first processor system 202 can specifically be detected by means of an absence of communication from the first processor system 202 via the interface to the second processor system 204.

As depicted in FIG. 2, the control unit ECU further comprises a supply multiplexer 216, which is coupled to the two batteries BAT-1 and BAT-2 (indicated in FIG. 2 by the corresponding terminal K30-1 or K30-2). The resulting redundancy with reference to the energy supply increases the failure safety of the control unit ECU.

An internal supply 218 (with a voltage transformer, for example) that is coupled to the supply multiplexer 216 supplies the other internal assemblies of the control unit ECU. These include in particular the two processor systems 202, 204, the changeover device 212, the monitoring device 214 and the H-bridge driver 210.

As also depicted in FIG. 2, the two processor systems 202, 204 possess an interface for wheel signals (e.g. wheel speeds), from which the respective processor system 202, 204 can infer the current vehicle velocity. The control unit ECU can communicate with other control units in the vehicle via a bus connection 222.

In an exemplary embodiment deviating from FIG. 2, the H-bridge driver 210, the second processor system 204, the changeover device 212 and the monitoring unit 214 can be combined all together or at least partially (e.g. without the changeover device 212 or the monitoring unit 214) into an integrated circuit. This integrated circuit can be configured as a separate ASIC within the control unit ECU, for example.

Figure 3:
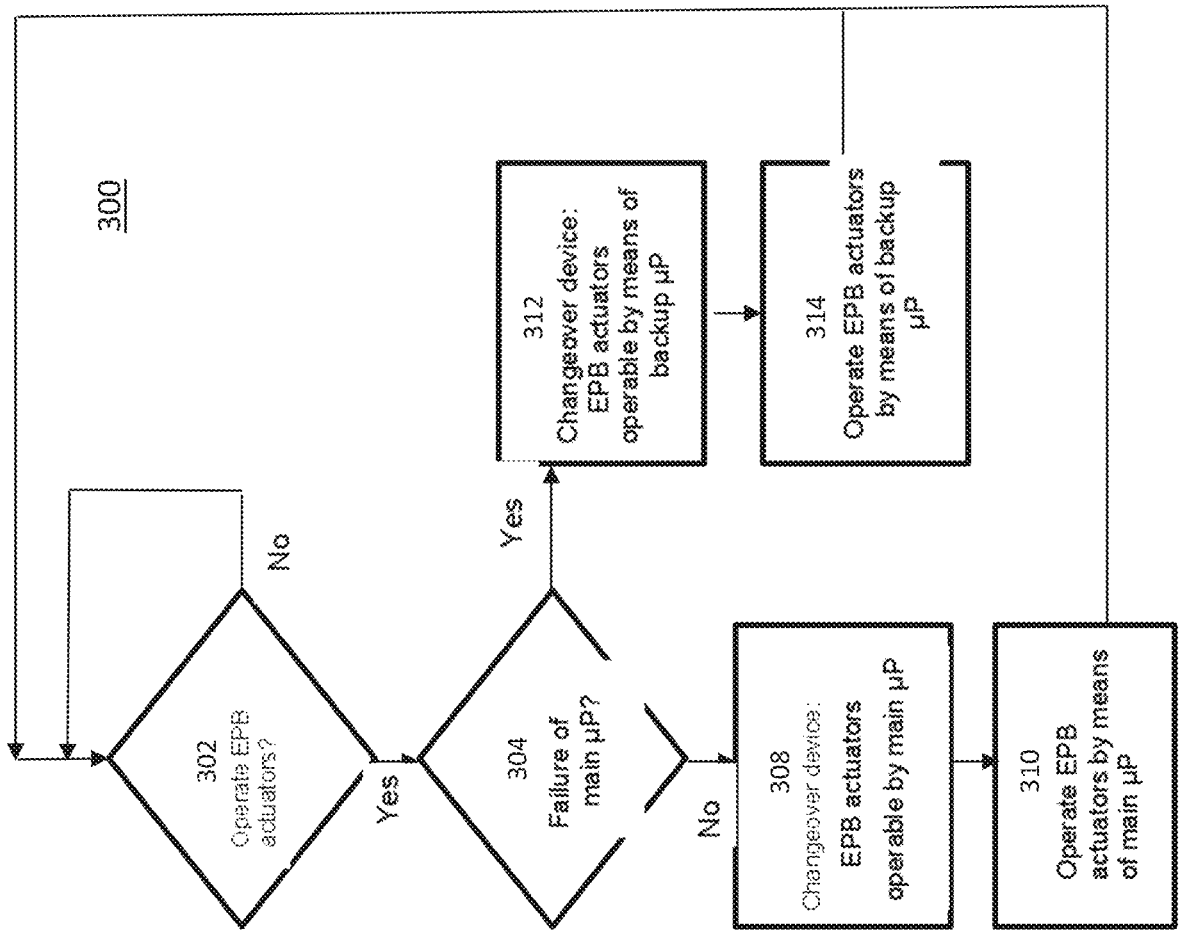
FIGS. 3 & 4 are flow diagrams of methods according to exemplary embodiments of the present disclosure.

An exemplary embodiment of a method aspect is explained below with reference to the flow diagram 300 according to FIG. 3. The steps of the exemplary embodiment are executed by one or more components of the control unit ECU depicted in FIG. 2.

In a first step 302, the first processor system 202 determines in a continuous loop whether the EPB actuators 13, 43 are to be operated. If this is the case, for example because a user operates the actuating element 80 of the EPB subsystem SYS-3 or because the control unit ECU automatically detects a requirement to operate the EPB actuators 13, 43, the method is continued in step 304. In step 304 it is determined by the monitoring device 214 whether the first processor system 202 is fully functional. It should be pointed out that the two steps 302 and 304 can also proceed in another way, e.g. nested or parallel to one another or in reverse order.

If no failure of the first processor system 202 is detected by the monitoring unit 214 in step 304, the changeover device 212 is left in a position or brought into a position in step 308 in which the EPB actuators 13, 43 are operable, in particular can be closed, by means of the first processor system 202. It should be pointed out that the normal state of the changeover device 212 can be selected so that the first processor system 202 is permitted to access the H-bridge driver 210. In step 310 the EPB actuators 13, 43 are then operated by means of the first processor system 202. The method is then continued in step 302.

However, if a lack of functionality of the first processor system 202, for example its failure, is determined by the monitoring device 214 in step 304, the method is continued in step 312. In step 312 the changeover device 212 is left in a switching state or is brought into a switching state in which the EPB actuators 13, 43 are operable by means of the second processor system 204. Thereupon an operation, in particular closure, of the EPB actuators 13, 43 takes place by means of the second processor system 204, before the method is continued in step 302. Alternatively or additionally to this, an error message can also result following step 314.

Figure 4:
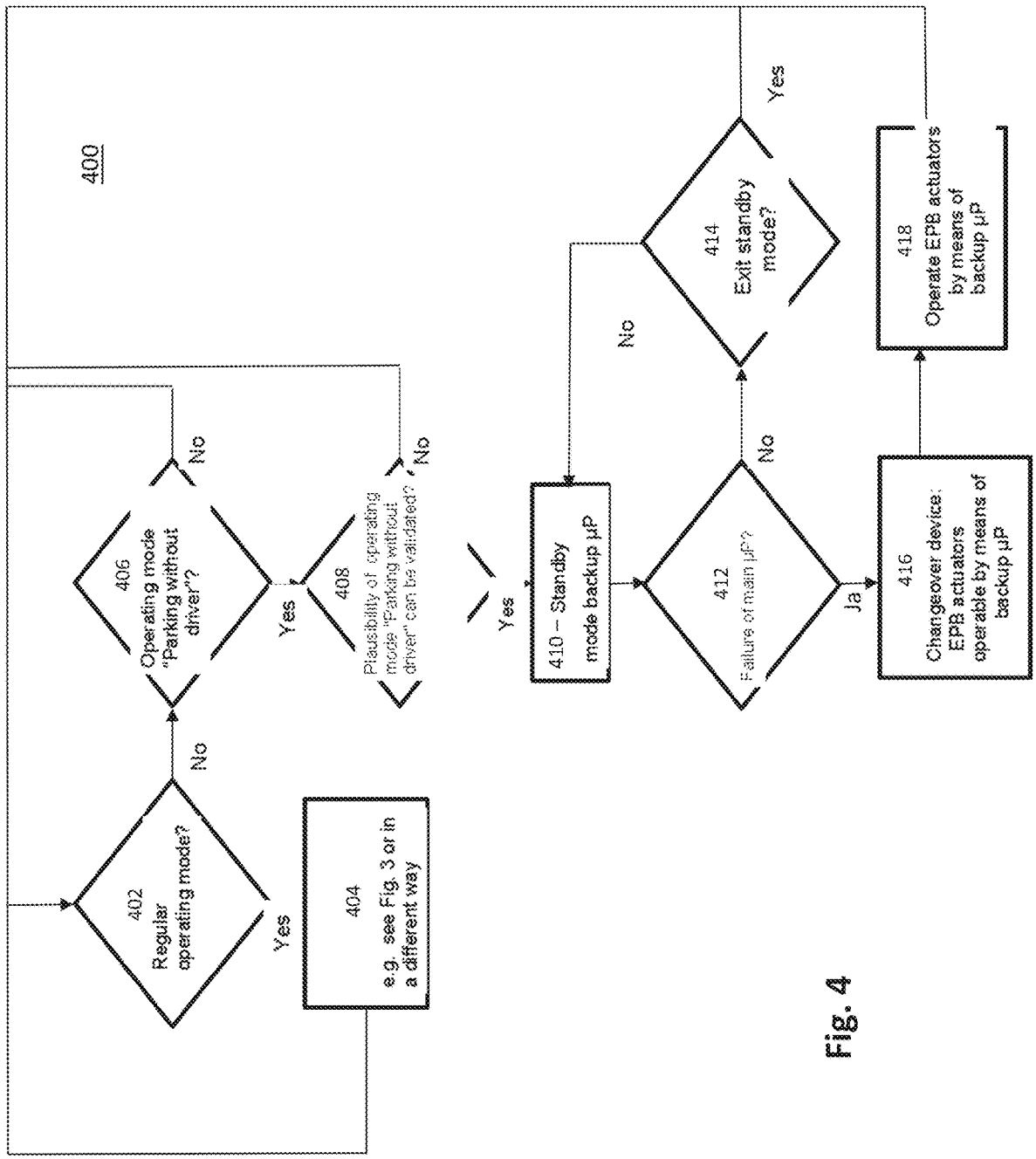

To enable the second processor system 204 to detect the necessity of operation of the EPB actuators 13, 43 in step 314, various configurations are possible. For example, the second processor system 204 can be coupled in parallel to the first processor system 202 to the input device 80. Furthermore, the second processor system 204 in many configurations can detect the lack of functionality of the first processor system 202 autonomously or at the indication of the monitoring device 214 and in this case close the EPB actuators 13, 43 automatically for safety reasons in step 314. This variant is explained in greater detail below with reference to the flow diagram 400 according to FIG. 4. FIG. 4 specifically shows an exemplary embodiment of a further method aspect in connection with an autonomous RCP operating mode ("parking without driver").

The method according to FIG. 4 begins in step 402, in which it is queried whether the current operating mode is a regular operating mode. The regular operating mode can for example be an operating mode separate from the RCP operating mode, for example conventional vehicle operation in the presence of the driver.

In the case of a regular operating mode, the method branches to step 404. In step 404 the procedure explained above with reference to FIG. 3 can be implemented. However, it could also be considered to implement a different procedure in step 404, since in the presence of the driver in the vehicle, for example, no requirement exists for the activation of the redundant second processor system 204 in the event of a fault in the first processor system 202. On the contrary, it is to be assumed in this case that the driver can still bring the vehicle to a stop himself in a redundant manner in the event of failure of the first processor system 202, for example via push-through operation of the subsystem SYS-2 from FIG. 1.

If it is detected in step 402 that no regular operating mode is present, the method branches to step 406 and checks whether the RCP operating mode is selected. If this should not be the case, the method branches back to step 402. It should be pointed out that the verification in step 406 could also be carried out in a continuous loop. In this case the steps 402 and 404 can be omitted.

If the RCP operating mode is detected in step 406, the method continues with an optional step 408. In the optional step 408 the plausibility of the detection of the RCP operating mode in step 406 is specifically validated. Such plausibility checking can take place, for example, in that the control unit ECU determines by means of the wheel signals 220 (cf. FIG. 2) whether the velocity is below a predetermined velocity threshold value. Above the threshold value of 10 km/h, for example, it can be assumed that the RCP operating mode was erroneously detected in step 406. In this case the method branches from step 408 back to step 402.

If the plausibility of the RCP operating mode is positively validated in step 408, on the other hand, the second processor system 204 is put into standby mode in a further step 410. In this standby mode the second processor system 204 continues to monitor the functionality of the first processor system 202 (step 412). Furthermore, the second processor system 204 then likewise continues to monitor in step 414 whether the standby mode should be cancelled. Exiting the standby mode is necessary, for example, if the RCP operating mode is terminated or if the vehicle velocity rises again above a threshold value. If exiting of the standby mode is detected in step 414, the method branches back to step 402.

The second processor system 204 can detect a lack of functionality of the first processor system 202, for example, in that the signals supplied on an ongoing basis by the first processor system 202 to the second processor system 204 (e.g. by inter-processor communication), for example wheel or velocity signals, fail to materialise. Checking of the functionality of the first processor system 202 in step 412 can also be carried out by the monitoring device 214, which communicates the monitoring result to the second processor system 204. As already mentioned above, the monitoring device 214 or a monitoring device parallel to this could also be integrated in the second processor system 204.

If a lack of functionality, for example a failure, of the first processor system 202 is detected in step 412, in step 416 the changeover device 212, controlled for example by the monitoring device 214, is left in a switching state or brought into a switching state in which the EPB actuators 13, 43 are operable by the second processor system 204. In a further step 418, the EPB actuators 13, 43 are then operated by means of the second processor system 204, namely closed for safety reasons. The vehicle is thus brought immediately to a stop and the RCP operating mode is accordingly terminated.

As results from the exemplary embodiments described above, cost savings can be achieved in that the control unit ECU can control both the EPB actuators 13, 43 (in regular EPB operation and independently of this) and at least one other function unit (such as one or both of the subsystems SYS-1 and SYS-2, for example). A separate EPB control unit can be omitted for this reason. For safety reasons, in particular for autonomous or partly autonomous driving operation, an option of controlling the EPB actuators 13, 43 by means of the first and second processor system 202, 204 is possible for the control unit ECU in a redundant manner. To permit a defined control access to the two EPB actuators 13, 43 to increase safety further, the changeover device 212 determines which of the two processor systems 202, 204 is to be permitted bus access to the EPB actuators 13, 43.

It is understood that individual aspects of the exemplary embodiments described above can be implemented even independently of the provision of a changeover device 212 in the control unit ECU. Furthermore, it could also be provided to limit the control capability of the control unit ECU to a single EPB actuator 13 or 43, so that two separate control units ECU can be provided for the two EPB actuators 13, 43 depicted in FIG. 2. In a variant derived from this, at least the H-bridge driver 210 and the two H-bridges 206, 208 can be provided outside the two control units ECU and used jointly by these. This also applies to the changeover device 212 in another variant.

The principle and mode of operation of this invention have been explained and illustrated in its preferred embodiment. However, it must be understood that this invention may be practiced otherwise than as specifically explained and illustrated without departing from its spirit or scope.

The invention claimed is:

1. A motor vehicle electronic control unit (ECU), comprising
   a first processor system, which is configured to control a pair of actuators of an electric parking brake (EPB) and at least one other motor vehicle function unit;
   a second processor system, which is configured to control the EPB actuators in an at least partially redundant manner to the first processor system;
   a changeover device having a first condition enabling operation of both EPB actuators via the first processor system when the first processor system has functionality and a second condition enabling operation of both EPB actuators via the second processor system when the first processor system has a lack of functionality.

2. The control unit according to claim 1, wherein the other motor vehicle function unit is configured to brake the motor vehicle or hold it stationary in a redundant manner to the EPB.

3. The control unit according to claim 1, wherein the other motor vehicle function unit is configured to implement one or more of the following functions: electric brake force boosting; anti-blocking control; vehicle dynamics control; control of an automatic transmission; electric brake force generation.

4. The control unit according to claim 1, further comprising at least one monitoring device, which is configured to monitor the functionality of the first processor system.

5. The control unit according to claim 4, wherein the at least one monitoring device is configured to control the changeover device depending on the functionality of the first processor system.

6. The control unit according to claim 4, wherein the at least one monitoring device is a function unit coupled to the first processor system and provided separately from the second processor system.

7. The control unit according to claim 4, wherein the at least one monitoring device is integrated into the second processor system and the second processor system has an interface, in order to couple the monitoring device to the first processor system.

8. The control unit according to claim 7, wherein the second processor system is configured to detect the lack of functionality of the first processor system by means of an absence of communication by the first processor system via the interface.

9. The control unit according to claim 4, wherein the second processor system is configured to close the EPB actuators directly in autonomous or partly autonomous driving operation if the lack of functionality of the first processor system is detected.

10. The control unit according to claim 1, further comprising an EPB driver circuit, which is configured to generate a control voltage for an H-bridge associated with each of the EPB actuators.

11. The control unit according to claim 4, further comprising
an EPB driver circuit, which is configured to generate a control voltage for an H-bridge associated with each of the EPB actuators; and
wherein at least the EPB driver circuit, the second processor system and the monitoring device are combined in an integrated circuit.

12. The control unit according to claim 10, wherein the changeover device is configured to selectively enable the operation of the EPB actuators either via the first processor system or the second processor system, in that either the first processor system or the second processor system is permitted access to the EPB driver circuit.

13. The control unit according to claim 10, further comprising
at least one bus system, which is configured to couple the first processor system and the second processor system to the EPB driver circuit; and
wherein the changeover device is configured as a bus multiplexer and is provided functionally between the first processor system and the second processor system on one side and the EPB driver circuit on the other side.

14. The control unit according to claim 1, wherein the second processor system has an interface for receiving a signal indicating a vehicle velocity, in particular a wheel speed and the control unit is configured to enable an operability of the EPB actuators by the second processor unit if it is to be inferred by means of the signal indicating the vehicle velocity that the vehicle velocity satisfies a predefined condition.

15. The control unit according to claim 1, wherein the control unit is configured to detect autonomous or partly autonomous driving operation and to enable an operability of the EPB actuators by the second processor unit if autonomous or partly autonomous driving operation is detected.

16. The control unit according to claim 15, wherein the autonomous or partly autonomous driving operation comprises an autonomous or partly autonomous parking or manoeuvring of the vehicle, in particular without the presence of a driver.

17. The control unit according to claim 15, wherein
the first processor system is configured to signal to the second processor system the autonomous or partly autonomous driving operation by means of inter-processor communication; and wherein
the control unit is configured to enable an operability of the EPB actuators by the second processor system only if the autonomous or partly autonomous driving operation was signalled to the second processor system by the first processor system.

18. The control unit according to claim 15, wherein the second processor system is configured to close the EPB actuators directly in autonomous or partly autonomous driving operation if the lack of functionality of the first processor system is detected.

19. A method for operating a pair of actuators of an electric parking brake (EPB) comprising:
selective operation of the EPB actuators via a first processor system or a second processor system, wherein the first processor system is configured to control both EPB actuators and at least one other motor vehicle function unit when the first processor system has functionality, and wherein the second processor system is configured to control the EPB actuators in an at least partially redundant manner to the first processor system when the first processor system has a lack of functionality.

20. A computer program product, comprising program code for carrying out the method according to claim 19 when the program code is executed on a motor vehicle control unit.

21. A control unit, comprising one or more storage devices, on which the computer program product according to claim 20 is stored.

* * * * *